United States Patent [19]

Pruitt

[11] Patent Number: 5,386,464
[45] Date of Patent: Jan. 31, 1995

[54] FEATURE CONTROL SYSTEM UTILIZING DESIGN ORIENTED STATE TABLE LANGUAGE

[75] Inventor: Leonard E. Pruitt, Stockholm, Sweden

[73] Assignee: Telefonaktiebolaget L M Ericsson, Stockholm, Sweden

[21] Appl. No.: 810,327

[22] Filed: Dec. 19, 1991

[51] Int. Cl.⁶ .................. H04M 3/42; H04M 11/00
[52] U.S. Cl. ................................. 379/201; 379/94
[58] Field of Search ............... 379/201, 207, 94, 112, 379/230

[56] References Cited

U.S. PATENT DOCUMENTS

| | | | |
|---|---|---|---|
| 4,277,649 | 7/1981 | Sheinbein | 379/201 |
| 4,695,977 | 9/1987 | Hansen et al. | 379/201 X |
| 4,727,575 | 2/1988 | Hansen et al. | 379/94 |
| 4,747,127 | 5/1988 | Hansen et al. | 379/94 |
| 4,763,350 | 8/1988 | Immendorfer et al. | 379/67 |
| 4,782,517 | 11/1988 | Bernardis et al. | 379/201 |
| 4,897,866 | 1/1990 | Majmudar et al. | 379/94 |
| 5,050,074 | 9/1991 | Marca | 395/600 |

FOREIGN PATENT DOCUMENTS 0382670  8/1990  European Pat. Off. ........... 3/545

OTHER PUBLICATIONS

*Automatic Programming of Communications Software Via Nonprocedural Descriptions*, Jerrold M. Ginsparg and Ronald D. Gordon, IEEE Transactions on Communications, vol. COM-30, No. 6, Jun. 1982.

Ljungblom, "A Service Management System for the Intelligent Network", Ericsson Review, No. 1, 1990, pp. 32-41.

*Primary Examiner*—James L. Dwyer
*Assistant Examiner*—Harry S. Hong
*Attorney, Agent, or Firm*—Johnson & Wortley

[57] ABSTRACT

A feature control system includes structure for initiating a change from one state to another state in response to a precipitating event, structure for generating a signal to identify a list of tasks to perform the transition, structure for retrieving the list of tasks from a previously formatted array and structure for processing the tasks to arrive at the second state. The present invention also provides a method for creating state table instructions which method includes the steps of formatting a program code to correspond to single entry two dimensional arrays, converting the program code to discrete integer pointers, interconnecting the tables to perform the tasks in a linear fashion and processing the tasks to arrive at a new state.

14 Claims, 6 Drawing Sheets

FIG. 3

Array of indexes to task lists (152 EVENT, 150 STATE)

| EVENT \ STATE | 1 IDLE | 2 | 3 | 4 |
|---|---|---|---|---|
| EVENT 1 | 1 | | | |
| EVENT 2 | | 3 | | |
| EVENT 3 | 2 | 4 | 6 | 8 |
| EVENT 4 | | 5 | 7 | 9 |

ARRAY OF INDEXES TO TASK LISTS

FIG. 4

| TASK LIST (154) | NO. OF TASKS IN LIST (156) COL. 0 | FIRST TASK COL. 1 | SECOND TASKS COL. 2 | TASK N COL. 3 |
|---|---|---|---|---|
| 1 | 3 | 1 | 2 | 5 |
| 2 | 1 | 3 | | |
| 3 | 2 | 2 | 5 | |
| 4 | 3 | 4 | 3 | 5 |
| 5 | 2 | 4 | 3 | |
| 6 | 3 | 2 | 3 | 5 |
| 7 | 2 | 2 | 4 | |
| 8 | 1 | 6 | | |
| 9 | 1 | 6 | | |

ARRAY OF LISTS OF TASKS

FIG. 5

| 158 EVENT \ STATE | 1 IDLE | 2 | 3 | 4 |
|---|---|---|---|---|
| EVENT 1 | 3 | | | |
| EVENT 2 | | 1 | | |
| EVENT 3 | 2 | 4 | 2 | 1 |
| EVENT 4 | | 3 | 4 | 1 |

ARRAY HOLDING NEXT STATE

FEATURE CONTROL SYSTEM UTILIZING DESIGN ORIENTED STATE TABLE LANGUAGE

BACKGROUND OF THE INVENTION

1. Field of the Invention

This invention relates to telecommunications exchanges and, more particularly, to a system for providing features within a telecommunications exchange.

2. History of the Related Art

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

State tables have been used in prior art systems to control the operation of a real-time process by designating a set of tasks to be performed in order to effect a transition from one state to the other. Computer languages have been developed wherein transitions from state to state are caused by the execution of a specific set of instructions imbedded within the computer code itself. These systems have proved cumbersome because as modifications to the system are required, the computer program must be recompiled along with the new lines of code necessary to achieve the desired changes and then downloaded to the switch.

State control techniques have been advantageously implemented in telecommunications exchanges due to the nature of the two party model for most communications. With such techniques, each party is sequentially transitioned from state to state to implement the various features of the desired communication. Those transitions are conveniently performed in groups of tasks associated with either a particular special feature or simply those associated with Plain Old Telephone (POT) services. The provision of different features, such as three-way calling, has been a growing and important element in the sale of telecommunications services and the rapid implementation and modification of such features is vital to serving the modern telecommunications customer.

However, different customers may want different behavior for a given feature. Thus, flexibility in modifying features is important as customers change. Further, residential and business subscribers which are likely to have different needs are also likely to be utilizing the same switch. With a feature implemented in fixed, compiled code it is expensive to provide for the many variations in the feature which will be required for the various particular customer applications. The code becomes large and complicated if multiple variants of a feature are placed in one block in fixed code. If a separate block is provided for each variant then the sum of the code size for all the variants together becomes very large and the overhead and memory costs are repeated for each block. Fixed code also fails to adequately provide for unforeseen future needs since the only way to provide new behavior in a feature implemented in fixed code is to recompile and re-install the program.

One prior art system disclosed in U.S. Pat. No. 4,727,575 to Hansen, et al. includes a software mechanism which provides that specified actions to transition from state to state were performed irrespective of the circumstances under which the event causing the state transition occurred. The state changes are achieved independent of the overall program and allow for new features to be added even though the programmer did not have knowledge of the original code and its interaction with the new code. The Hansen patent, however, requires an individual computer associated with each customer unit in order to execute the program along with the addition of new lines of code for modification as new features and customers are added and changed.

Rapid expansion and rapid changes in the telecommunications field requires rapid development of new features for telephone subscribers. Because the sale of new features and enhancements provide an ever increasing portion of the switched telephone business it is important to satisfy the needs of customers in a timely manner. Design methods currently in use with programs which utilize fixed code require a period of approximately one and a half years from initial demand to ultimate delivery. All known prior attempts to solve the above specified problems have involved extensive textual descriptions of the requirements and method of implementation. Where tables have been employed for the specification, they have been either too imprecise for direct translation to computer data for controlling the feature program or they have specified an entire system rather than just the part of the switch providing the feature logic. There have not been any programs using the fully flexible, table-driven approach of the system of the present invention which directly connects the tabular description of a fixture with automatic implementation thereof. The prior art has relied heavily on textual description and fixed-code programs which have no flexibility, no provisions for change without revision of the source code, re-compilation, and re-installation. In addition, the fixed-code solutions of the prior art provide no reasonable provision for multiple variants of a specific feature.

From the foregoing, it can be seen that there exists a need for a software mechanism that provides for state controlled processes by a language which is independent of the computer code used to implement the various tasks associated with a transition from state to state. This new language utilizes tables which can be formulated directly from the tabular description of a feature and then compiled or stored. These tables can be easily modified to provide for new features without recompiling the program code or the tables themselves.

SUMMARY OF THE INVENTION

In one aspect the system of the present invention includes an event and task table which is an array of indexes to an array of lists of tasks (task table). The event and task table defines for a given feature such as three-way calling the various states through which the call can transit and the events which precipitate those state changes. The event and task table specifies for a given state and event an index to a list of tasks to be performed in order to complete that transition.

From the event and task table, a kernel accesses a task table which is an array of lists of tasks. For each identified task list there is a sequence of tasks to be performed associated with that list. By operation of a control program, or kernel, the event and task table is accessed and analyzed, via state and event indexes, to determine which list of tasks is to be accessed. The kernel then causes each of the tasks in the list to be performed in sequence.

When that list of tasks is successfully executed, the next state table is accessed via current state and event indexes. Once the next-state table is accessed, and the value fetched is stored as the current state, the kernel directs the operation back to the event and task table and awaits the next precipitating event to start the sequence again, if necessary. The event and task table, task table, and next-state table collectively implement a feature and are referred to collectively as a feature table set. The table-driven feature program (feature program) reads a feature table set stored in computer memory which specifies how a telephone subscriber feature should behave. The feature program, according to input it receives about what the subscriber has done, reads the feature table set to decide what its next task or tasks to perform and state to occupy shall be. The feature program executes those tasks and sets the state according to the data in the next table of the feature table set.

Different feature table sets may be stored for different subscribers so that each subscriber who desires may have a customized feature. The present invention also encompasses a programming technique for handling both procedures and signals in the feature program. The use of a feature program supports a rigorous and quick procedure for simultaneously describing and implementing a feature. Further, it enables a very fast and flexible way of changing the way a feature behaves without recompiling the feature program. Only the data stored in the tables needs to be changed to enable a change to be made in the behavior of the feature. Changes to a feature program, which has already been installed, can have the same syntax checks and correctness checks as are provided for pre-installation table translations if the data is first put through an analyzer. The technique automatically supports a high degree of consistency and quality of feature design by ensuring that pure finite-state machine principles are followed.

If a problem is discovered with a feature or the customer simply wishes for a feature to behave differently than it currently does, this method offers the possibility of changing the feature without re-installing or recompiling the feature program. Only the data controlling the feature program needs to be changed. This can be done quickly in the field. Complicated, often error-prone patches are not required.

The method of the present invention also controls state transition by use of tables which greatly enhances state-oriented design of the various features. The use of tables in this manner allows for a close correspondence between the design of a new feature and its implementation since both can be formatted in tables. Changes within the system are easily effected by simply changing certain values within a table rather than recompiling the entire feature program. The development of a state table to control code is greatly enhanced because it can be derived automatically from a feature table set which describes the feature in an easily understood manner. Furthermore, the use of tables is compatible with existing switch hardware and software in that it mainly requires data space which is available and inexpensive.

BRIEF DESCRIPTION OF THE DRAWINGS

FIG. 3 illustrates an event and task table;

FIG. 4 illustrates a task table table;

FIG. 5 illustrates a next-state table.

DETAILED DESCRIPTION

Figure 1:
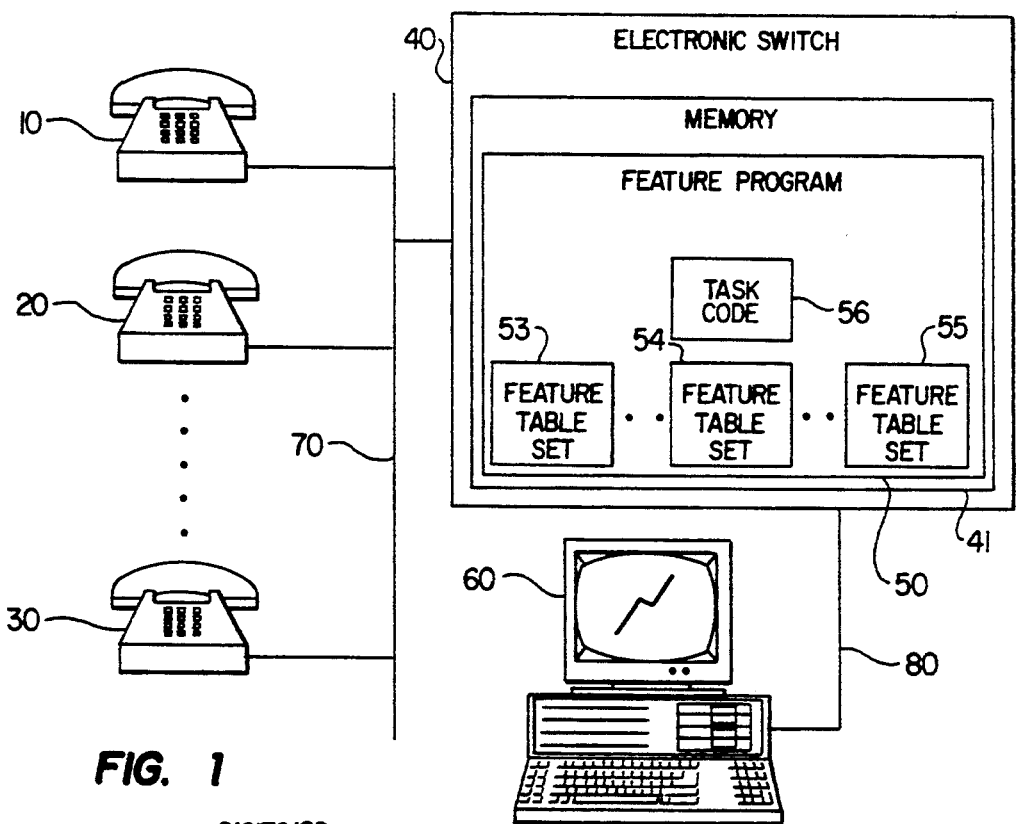
FIG. 1 illustrates, in block diagram form, a telecommunication system utilizing the system of the present invention.

The system of the present invention is advantageously implemented by the hardware system illustrated in FIG. 1. It would be obvious, however, to one skilled in the art that other hardware systems are controllable by the illustrative software system. The hardware of FIG. 1 comprises a plurality of customers units 10–30. Voice and data information is communicated from the customer units 10–30 via transmission lines 70. Voice and data transmission is sent to electronic switch or stored programs controlled (SPC) telecommunications exchange 40 which comprises the hardware and software necessary for interconnecting the subscribers and controlling the flow of voice and data transmission. Within the electronic switch 40 is memory 41 which contains a feature program 50 which embodies and utilizes the method and system disclosed in the present invention. The feature program 50 is comprised of a plurality of feature table sets 53–55, a kernel 52, and fixed task code 56. The electronic switch 40 is connected by data transmission line 80 to computer interface 60 which is utilized to modify aspects of the feature program 50 as necessary. It would be obvious to one skilled in the art that other methods could be utilized to control and modify aspects of the feature program 50 and language.

Part of the method for speeding up the development of a feature employed in the present invention is to specify, unambiguously and precisely, what the feature providing program is to do. It is difficult to specify complex feature behavior in text in a natural language like English. In order to overcome this difficulty with natural languages, a language called Design-Oriented State Table Language (DOSTL) is defined. DOSTL removes ambiguities and the difficulty of following the many different alternative sequences of events which can occur with subscriber features when they are described in natural language text. To a certain extent, this language provides self-checking features to ensure that the designer has anticipated all possible situations.

Figure 2:
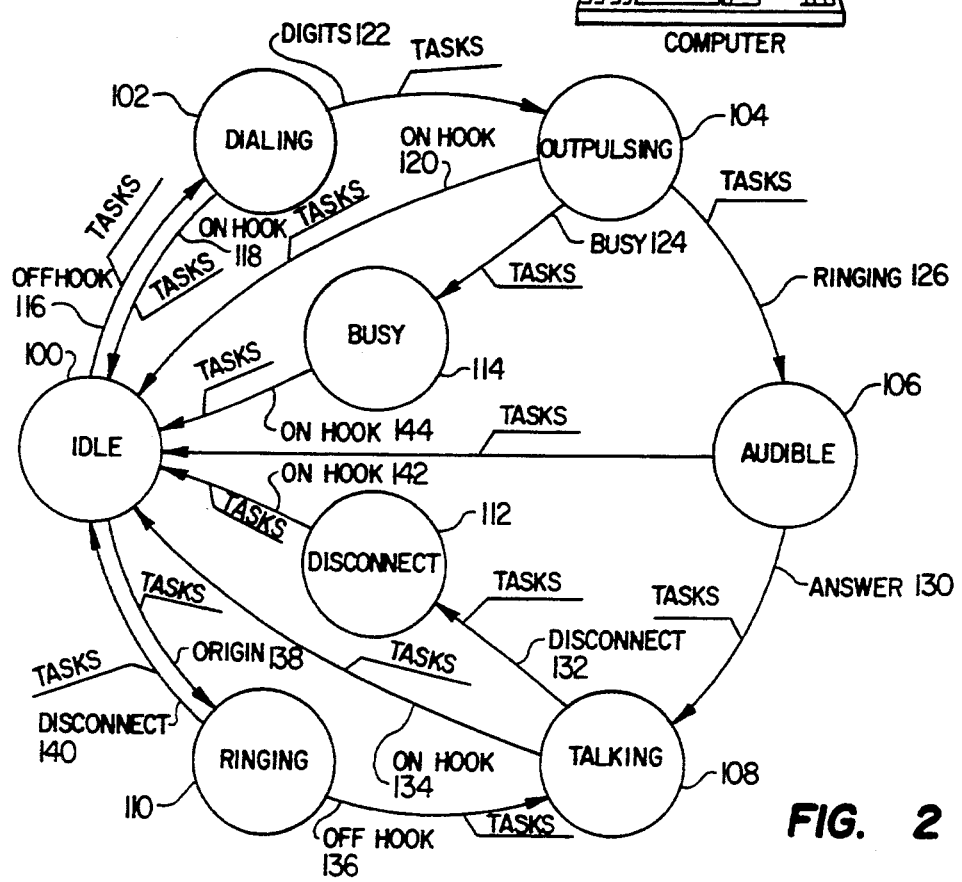
FIG. 2 illustrates, in state diagram form, the states of a customer unit of the telecommunication system of FIG. 1.

FIG. 2 illustrates in state graphic form, the various states 100–114 at which one of the customer units 10–30 may be during any particular point in time in the progress of a line-to-line call. It would be obvious to one skilled in the art to expand the number of illustrative states to meet new system requirements. In addition to the signals illustrated in FIG. 2, leave and enter signals may be generated each time a state transition occurs. Associated with each transitional event are a number of tasks 150 which are performed in sequence in order to complete the transitions required. Signals 116–144 represent the events whose individual occurrences causes a transition from one state to another state. It would be obvious to one skilled in the art to expand the number of signals to meet new feature requirements.

For example, in order to place a call, a customer unit 5 must be initially in an idle state 100 and go off-hook. The event of going off-hook places the customer unit in a dialing state 102 via off-hook signal 116. Off-hook 116 is the event which precipitates performance of a series of tasks 150 to arrive at the new state of dialing 102. After the appropriate digits have been collected from the terminal, the state is changed from dialing state 102 to out-pulsing state 104 via a digits signal 122. Again, the collection of digits is performed by a series of tasks 150. Of course, the tasks associated with the off-hook state 116 would probably be different from the tasks associated with the out-pulsing state 104.

In the out-pulsing state 104, the party being called is sent a request for call termination. If the called party is busy, then busy state 114 is entered via busy signal 124. If the calling party unit goes on-hook while in the out-pulsing state 104, or the dialing state 102 or the busy state 114, then the calling party unit is returned to idle state 100 via either an on-hook signal 120, 118 or 144 respectively.

If the called customer unit is not busy, then the calling party unit enters the audible state 106 via ringing signal 126. While in the audible state, the calling party unit hears a ring back tone. If the calling party unit goes on-hook during the audible state 106, it is transferred back to the idle state 100 via on-hook signal 128. Once the called party unit answers the call, the calling party unit is transferred to the talking state 108 via answer signal 130.

Upon entering the talking state 108, the calling and called parties communicate with each other via voice and data transmission lines 70. If the called party hangs up first, the calling party is transferred from the talking state 108 to the disconnect state 112 via disconnect signal 132. If the calling party hangs up first, the calling party is transferred from talking state 108 to idle state 100 via an on-hook signal 134.

Consider the previous example from the point of view of the called station. Upon receipt of a message indicating that another customer unit wants to set up a voice connection, the called customer unit is transferred from idle state 100 to ringing state 110 via origin signal 138. While in the ringing state 110, the called party receives an audible ringing indication. If the called party unit goes off-hook, it is transferred to the talking state 108 via off-hook signal 136. If instead, the calling unit goes on-hook while the called unit is in the ringing state 110, it transmit a disconnect signal contained in a message communicated via transmission lines 70. In response to the disconnect signal, the called customer unit is transferred from the ringing state 110 to the idle state 100 via the disconnect signal 140.

Having reviewed the state table conceptualization of conventional telecommunications switching, a feature table set for implementation of the transitions from various states illustrated, such as those illustrated in FIG. 2, in accordance with the system of the present invention is illustrated in FIGS. 3, 4 and 5. FIG. 3 is an example of an event and task table which includes the set of states associated with a particular feature or service. The states 150 are identified by the column headers. The states, of the types illustratively shown in FIG. 2, which would be identified by numerals in an event and task table such as FIG. 3 are states 100-114. The row headers within the event and task table of FIG. 3 represent the different events 152 which precipitate changes from state to state in order to complete a particular feature or function. The precipitating events, of the type also illustrated in FIG. 2, which would be identified by event numerals in an event and task table such as FIG. 3 are events 116-144. An event and task table as shown in FIG. 3 would be associated with a particular feature such as call waiting or three way calling and is stored as a data array in a traditional memory system.

The event and task table is accessed by the feature program 50 in response to an event such as the calling subscriber going off-hook to initiate a call. The off-hook condition is translated to an electronic signal which is interpreted by the feature program 50 and associated with a predetermined event number stored in the event and task table. The kernel, more fully described below, takes the intersection of the event row and the current state column from an event and task table as depicted in FIG. 3 and derives as its output a number associated with a task-list.

Thus, depending upon a particular feature, the array shown in FIG. 3 would have as its output a number associated with a task list which is specific to the tasks required in order to effectuate the particular state change precipitated by the incoming event.

Since the event and task table and the task-list appendix are represented in a particular format and according to a set of syntax rules, a feature program can read the table and perform a number of useful operations on the data.

When a DOSTL state table is input to the kernel, another essential table must also be available to the kernel at the same time. The other essential table is the task table which is derived from the DOSTL state table.

FIG. 4 is a task table associated with the task list number which was generated as the output from the event and task table of FIG. 3. The rows of FIG. 4 comprise the numbers associated with the task lists 154. Each task list has associated with it a first column zero 156 which identifies the number of tasks in that particular list. A task counter is used to instruct the kernel to perform the sequence of tasks associated with the task list. The remaining columns of FIG. 4 contain an identification of the various specific tasks which must be performed in order to complete that task list and thus complete the transition from one state to the other. As will be more fully described below, each task number includes a pointer to program code to perform that task which is contained in memory. Once all of the tasks are performed with respect to a particular task list, the system then looks to FIG. 5 showing the array holding next state to determine the next state. The rows of FIG. 5 comprise the precipitating events 158 which initiate the transition from one state to the other. The columns of FIG. 5 comprise the new states 160 or the next state that is to be achieved. Once an output is obtained from the next state table of FIG. 5 and the new state table has been set, the operation returns to the event and task table of FIG. 3 to await another precipitating event.

For any particular feature, such as calling waiting or three way calling, there is associated one of each of the tables represented by FIGS. 3, 4 and 5. These tables are operated upon by a kernel which executes the series of steps necessary to work through the input and output side for each of these tables.

State-altering data may be received in one or more signal parameters. Each unique, state-altering combination of data which may possibly be received by a feature program must be considered as a separate "event". That is, each "combination" of data must be considered as a separate event.

For example, consider the case where a signal SUBACTIVITY has two parameters capable of altering the state. The parameters are parameter "x" and parameter "y". Parameter "x" specifies the subscriber as "A", "B", or "C". Parameter "Y" specifies the action the subscriber has performed. Valid possible values for "Y" are "answer", "flash", or "on-hook". If it is possible to receive all possible "Y" values for each of the possible "X" values then the number of valid events is nine. The number of combinations is found by adding up all the valid possible combinations of data. In this case, it is three subscribers, times three things they can do, equal nine combinations. If a feature program could never receive a combination in which subscriber "C" flashed, then the number of combinations would be eight.

A set of symbols is listed in the feature program of the present system which defines the set of valid possible combinations of state-altering data which the feature program can received. This list represents the set of events which the feature program is capable of resolving or decoding from state-altering signals. In the present example the list is as follows:

A-Answer=1;
A-Flash=2;
A-Disconnect=3;
B-Answer=4;
B-Flash=5;
B-Disconnect=6;
C-Answer=7;
C-Flash=8;
C-Disconnect=9;

In order to be complete, the above list must include all of the state-altering data combinations for all state-altering signals which the feature program can receive. Each unique, state-altering combination of data available in any state-altering signal, which is used or planned to be used in the feature program, must be represented in the feature program as a corresponding unique number symbol. Integer values, starting at one, are then assigned sequentially to each of these symbols continuing through all possible combinations in all possible signals.

Fixed code must be present in the feature program to assign the correct symbol, and therefore the correct integer value, to a variable "event". The value of the variable event then corresponds to the actual event which has been determined to have been received by the feature program when a state-altering signal arrives.

The code which analyzes signals received by the feature program is fixed code. This code must be able to analyze the numerous parameters received in an incoming signal. The code must also know which of those parameters are capable of altering the state. A given combination of data received in the signal, which is capable of altering the state, must be assigned a unique integer value. This value, called here the "event", is then used as an index, along with the current state, to access two of the arrays stored in the program, such as those depicted in FIGS. 3 and 5.

Assuming for the moment that FIGS. 3, 4 and 5 are the appropriate feature table set for plain old telephone (POTS) service, consider the example where a subscriber unit 10 is calling a subscriber unit 20. Subscriber unit 10 is in an idle state 100 as illustratively depicted in FIG. 2. This state might illustratively correspond to state 1 as represented in FIG. 3. In this example, the first event which the subscriber 10 would precipitate would be an off-hook 116 to transfer to a dialing state 102.

Assume, further that off-hook transition 116 corresponds to event 3 represented in FIG. 3. The intersection of state 1 with event 3 from FIG. 3 would produce task list number 2. The kernel would then refer to a task table, such as FIG. 4, and look to the row identified as task list number 2. Task list number 2, in the present example, has only one task associated with it, as identified in column zero 156, and the task itself is identified in the column 1 first task, as task number 3. The system then uses the identification of the task as a pointer to a set of program code that will then execute a series of steps to perform the task associated with the number 3.

In this example, since there is only one task to be performed, the system then looks to the next state table as exemplified in FIG. 5. If there had been numerous tasks to be performed, they would be sequentially performed in columnar order until all tasks associated with the task list were completed. Therefore, having completed task number 3, which in our example is the task associated with off-hook 116, the system then moves to FIG. 5 which comprises the current state and precipitating event which started the transition from one state to the other. In the above example, the initial state was state number 1, i.e., idle, and the event was number 3. Therefore, the next state would be state 2 which is shown on FIG. 2 in the example as dialing state 102.

At this point, the system awaits a second precipitating event to then begin the sequence again in order to make the appropriate state transition.

If all the syntax and formal rules of the DOSTL are met, there are four basic outputs types possible from the generator part of the processor: storable array data; compilable array data; fixed-code; and testing data. Each of these are described in more detail below.

Output Format For Storable Array Data

In the case of storable array data output, the feature program has already been compiled and installed in the switch. The feature program has available spare arrays which are used to store data for future features or feature variants. The feature described by the DOSTL table is analyzed by the DOSTL processor and the output format requested is "storable data". In this case the output from the DOSTL generator is a list of switch-operator commands which are stored in a file which is then input to the switch. Such switch-operator commands perform the function of storing the data from the DOSTL table and appendix (the specified state machine) directly into a set of spare arrays in the feature program.

Output Format for Compilable Array Data

In the case of compilable array data output, the feature program has not already been compiled and installed in the switch. This is a case where the feature program is still under development prior to being installed in the switch. Data can be stored in the arrays of a feature program either before or after the feature program is installed in the switch. The feature described by the DOSTL table is analyzed by the DOSTL processor and the output format requested is "compilable data". In such case, the output from the DOSTL generator is a list of compilable data statements which are stored in a file, which is then inserted into the data section of the source code of the feature program. This is a manual operation done by a designer using a standard text editor. The feature program is then compiled prior to being tested and installed in a switch.

Although the output of the generator in this case is source code, it is not directly executable source code. Rather, it is data representing the state machine which is represented by the DOSTL table. Such source code is a set of assignment statements which are only executed to store the data into the arrays of the feature program.

Output Format for Fixed Code

In the case of fixed code output, the feature program has not already been compiled and installed in the switch. This is another case where the feature program is still under development prior to being installed in the switch. In this situation, the feature described by the DOSTL table is analyzed by the DOSTL processor and the output format requested is "fixed code". The output of the DOSTL generator in this case is directly compilable and executable source code, in the appropriate language. For each cell which is used in the DOSTL table, a segment of source code is generated and each segment of code is preceeded by a label which corresponds to the appropriate current state and event intersection. The label is then followed by a list of procedure calls which correspond to the set of tasks to be performed in that cell. Each code segment is then terminated by the next state assignment.

The file which the DOSTL generator has produced containing the above described source code is then inserted into the source code shell used for feature programs. This is also a manual operation done by a designer using a standard text editor.

Additional manual editing and coding must also be done in this case. A case statement providing branching to the set of labels addressing the code for the current state must be provided. For each of these units of code (one for each state) an additional case statement must be provided which will further branch to the appropriate segment corresponding to the event which has occurred. The case statement at state level and the next case statement for events valid in that state allow execution of the segment of code for the concerned cell. The feature program is then compiled prior to being tested and installed in a switch.

Code produced in accordance with the above procedures will run slightly faster than table-driven code. Additionally, fixed code requires more program store but less data store, since there are no tables in the common store for fixed code. The major tradeoff for fixed code is that it does not have the flexibility of table-driven code. In order to change the fixed code feature program, it must be re-compiled and re-installed or patched, both of which alternatives have severe drawbacks. Also, while it is not practical for reasons of program store limits to place many variants of one feature inside a fixed-code feature program, there may be customers or developers who wish to generate hard code for their own reasons.

Output Format for Testing Data

In the case of testing information output, the feature program has been compiled but not installed in the switch. This is another case where the feature program is still under development prior to being installed in the switch.

In this case a feature described by the DOSTL table is analyzed by the DOSTL processor and the output format requested is "testing data". The output of the generator in this situation is a set of instructions to a source code interpreter which allows the feature program to be tested prior to being installed in a switch.

For each cell which is used in the DOSTL table, a set of test instructions are generated. Each set of test instructions for a given cell will test that signals are sent and received properly during tasks. For tasks which do not involve signalling, assignment statements can be checked. Also, at the end of each list of tasks, the interpreter checks that the next state assignment has been made.

In the case of test data generation, an aspect of the DOSTL processor is relied upon which is quite different from the capabilities used in the generation of the other three types of output. In this case, as in the other three cases, data for each cell must be generated, however, in this situation that set of outputs is not sufficient by itself. In order to perform proper testing, all the states of the state machine must be exercised in proper order and, to do this, the DOSTL processor's knowledge of the rules of state machines is relied upon to cause the generator to produce output which will exercise all the states in the feature and all the transitions in the feature. This will not exercise all possible paths in the state diagram. Any substantial state machine, such as one which is associated with a subscriber feature, will generally have loops in it which means that there will be an infinite number of paths through the state diagram. In this case, testing of all states and all transitions is a useful subset of the infinite number of possible test cases.

The file which the DOSTL generator has produced containing the above described test data is then input to the interpreter along with the feature. Output from the interpreter will confirm or deny that the feature has been constructed according to the DOSTL state table.

When using the DOSTL processor for testing, it is in a sense checking itself since it is checking table-driven code, the feature table set for which it has also generated. This can provide a useful cross check of the entire feature program and its state table. In addition, numerous details of signalling can be checked automatically with this method which are otherwise rather laborious to check.

A feature program can only execute a task if that task is present in fixed code in the program. Therefore, a task which is specified in a task list definition in the appendix of a DOSTL state table muse be available in fixed code in the feature program.

The feature program converts signal parameters to a single integer value representing the event. The feature program uses a similar but somewhat reversed process for tasks. The feature program reads an integer value from the array and then, using a case statement, determines which task to execute. Obviously, any integer fetched from the array must have a corresponding task procedure available in the feature program, otherwise that task cannot be performed.

A list of all tasks which the feature program can execute must be available to the analyzer so that the analyzer will know whether a task specified in the DOSTL table is actually available for the installed feature program to execute. A task specified in the DOSTL table, in the task list definition appendix, must be in the task list part of the event-task table, otherwise an error message will be generated for each occurrence of that task in the table.

Administration of Event-Task Table

The nature of feature programs is such that the size of the tables is basically a function of the number of states and the number of events. Subscriber features which are quite different from each other should be able to resolve different sets of events and have different sets of tasks. Such tables become very large and the feature program might be unable to hold all possible tasks if there were only one feature program which held all possible features and variants. Therefore, it is preferable that there will be a number of feature programs, each of which handles a set of related features. The related features are related in the sense that there is substantial overlap in the set of events which must be handled and there is substantial overlap in the set of tasks with which each of the features is concerned.

One event and task table is maintained for each of the installed feature programs. When a DOSTL table is to be analyzed, it must be determined which feature program it is targeted for. When the target feature program is determined, the appropriate event and task table is input to the analyzer, then the DOSTL table can be analyzed.

The number of states and the number of events associated with the event and task table of FIG. 3 can be conformed in any number of sizes to contain the necessary task lists to accomplish any particular feature. Likewise, the number of tasks associated with a particular list as illustrated in the table of FIG. 4 can be configured to perform any number of tasks necessary to achieve the event and task transition called for by the state table of FIG. 3.

Figure 6:
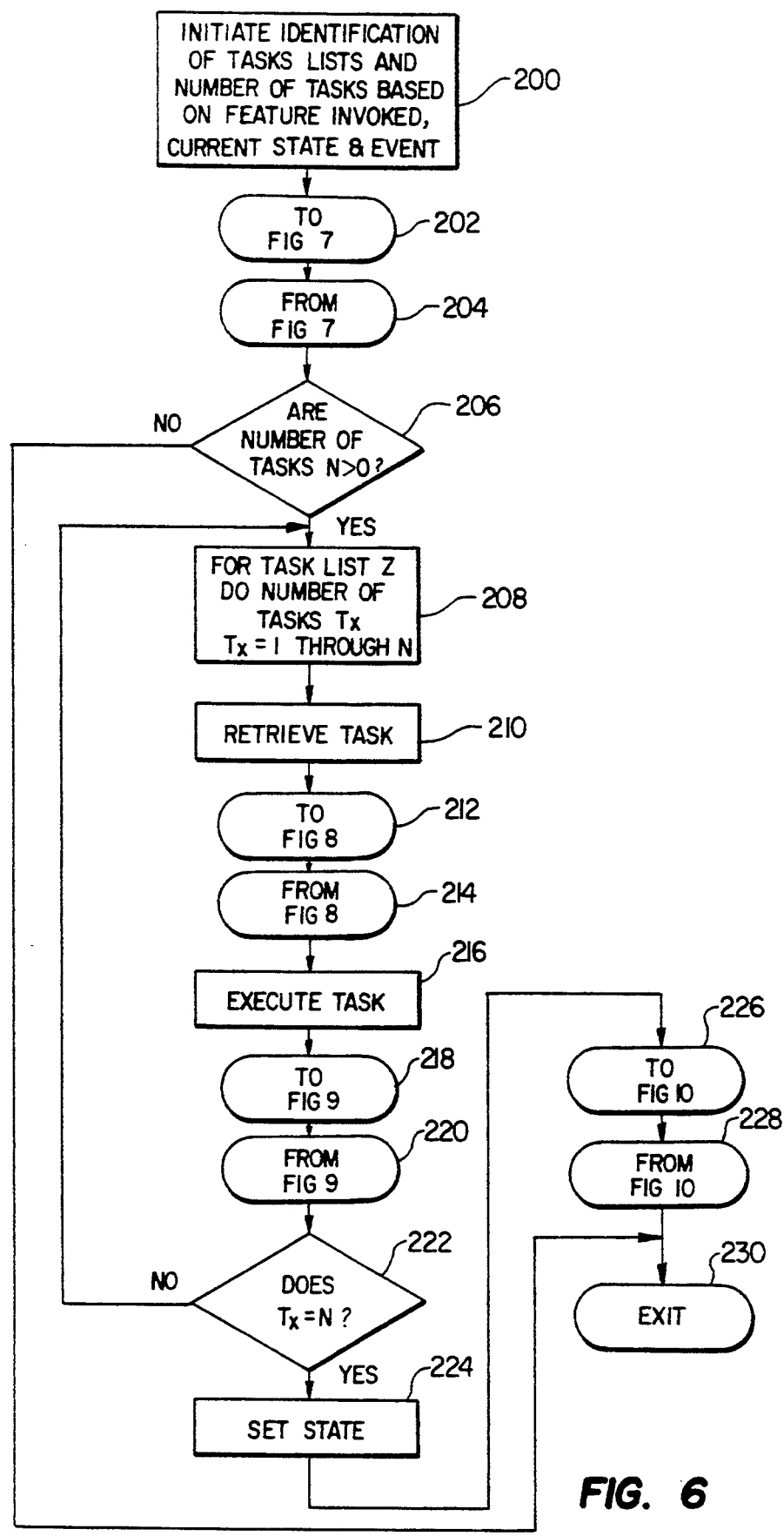
FIG. 6 illustrates in flow chart form the kernel which controls implementation of design oriented state table language.
Figure 7:
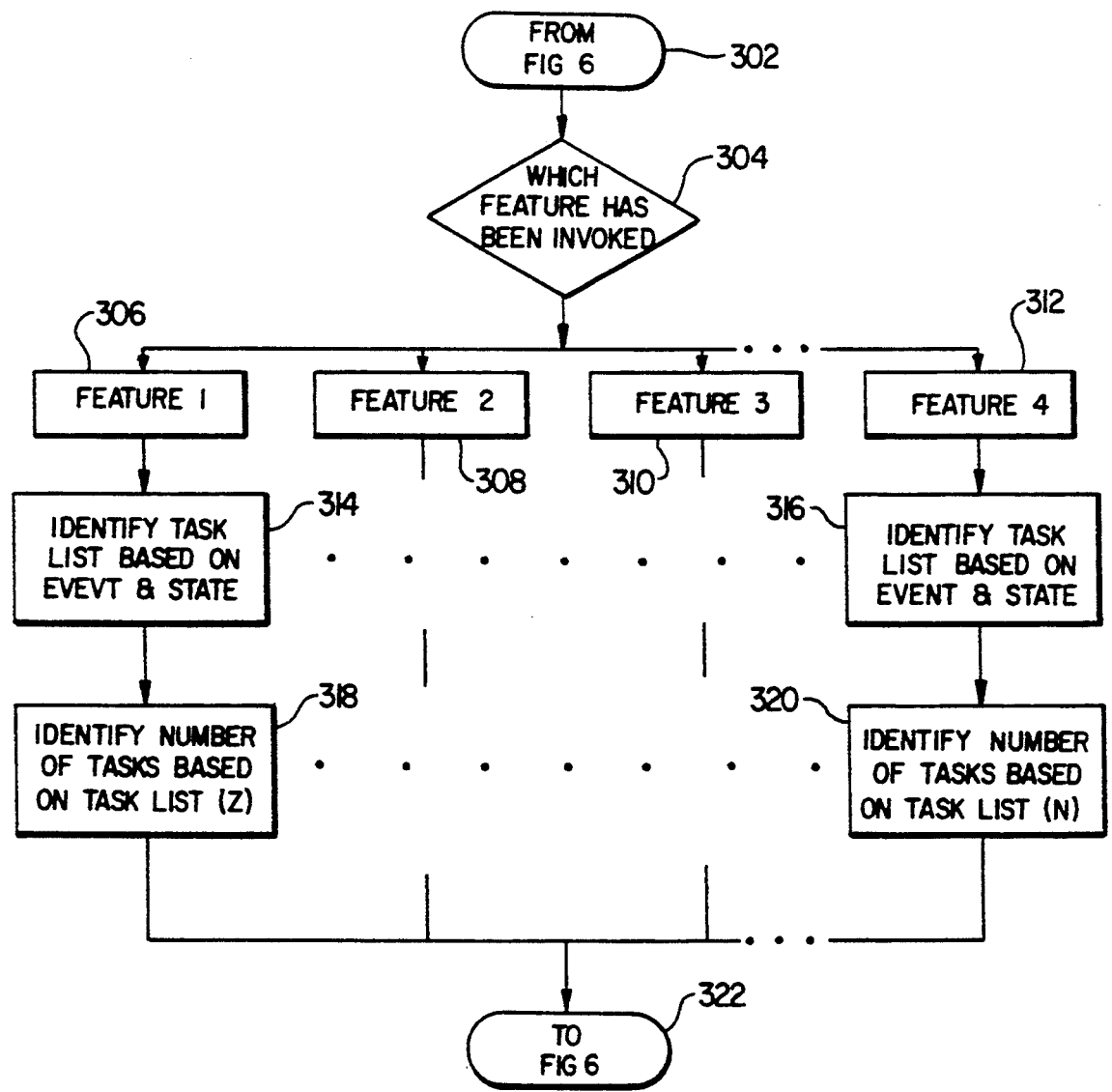
FIG. 7 illustrates in flow chart form identification of a task list and number of tasks from an array of task lists.

To fully understand the present invention and the manner in which the kernel drives the interaction between the tables shown in FIGS. 3, 4, and 5, FIG. 6 depicts a flow chart diagram illustrating the operation of the kernel of the present invention. Referring now to FIG. 6 the kernel directs the operation and interaction of the state tables of FIGS. 3, 4 and 5. The kernel begins at box 200 whereby initiation of the identification of task lists and the number of tasks to be performed is retrieved from memory based on the feature invoked, the current state and the precipitating event signalling a transition from the current state to the new state. At 202, the kernel proceeds to FIG. 7 and step 302 at which point, the logic enters decision step 304 which seeks to determine which feature has been invoked. As discussed earlier, each feature has associated with it three separate tables through which the kernel proceeds. Therefore, depending on which feature has been invoked, the flow is directed to one of the feature chains 306 through 312. Once a feature has been identified the kernel then seeks to identify the task list based on the precipitating event and current state, e.g., at 314 for feature 1 and at 316 for feature N. The identification of a task list is illustrated by reference to FIG. 3, which as previously described, retrieves a task list index number based on the two inputs of event and current state. Once that task list index number is identified the logic of FIG. 7 proceeds at 318–320 to determine the number of tasks to be performed. The number of tasks to be performed "N," is drawn from a task table such as that shown in FIG. 4. As will be discussed below, the number of tasks "N" is used as an identification of how many times the kernel must fetch a task and execute it. Once the task list has been identified and the number of tasks has been identified the flow moves to 322 from which it proceeds back to FIG. 6.

Figure 8:
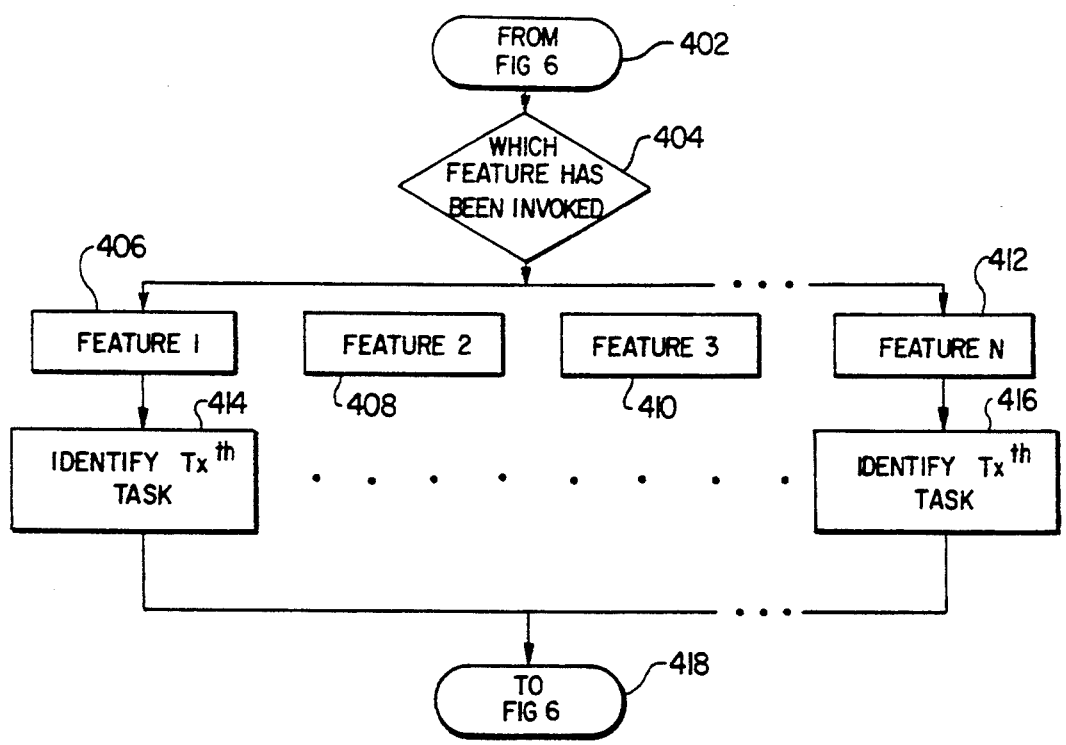
FIG. 8 illustrates in flow chart form the identification of a particular task to be performed.

Referring to FIG. 6 at direction circle 204, the flow moves from 204 to decision point 206, which there is a determination as to whether or not the number of tasks is greater than 0. This step is primarily a check to make sure that the task table from which the number "N" was drawn did not contain some error which would result in "N" being equal to 0. If the number of tasks identified was not greater than 0, the "no" path is taken to 230 for a fault result and exit. If the number of tasks is greater than 0, the "yes" path is taken at 206 and the kernel begins execution of the various tasks in a sequential manner. At 208, the variable $T_x$ is set equal to 1 and then incremented in consecutive integers until it reaches the value of "N". After setting the value of $T_x$, the flow proceeds to 210 at which it initiates retrieval of the $T_x$th task which, in the first instance, would be the first task. To initiate retrieval of tasks, the flow moves to 212 which takes it to FIG. 8 at step 402. Moving from 402 to decision point 404 the kernel determines which feature has been invoked. By identification of the appropriate feature, as either 406, 408, 410 or 412, the proper task table is retrieved and along with its corresponding task list. Features 406–412 can comprise whatever features have been devised by the system programmer, an example of which would be three-way calling or call waiting. After identification of the appropriate feature at 406–412, the flow proceeds to the corresponding step of 414–416 which identifies the $T_x$th task on the task list. For example, if this were the second time that the system had proceeded through the task list it would be identifying the second task on the list of tasks. The flow then proceeds to 418 and returns to FIG. 6 at 214.

Figure 9:
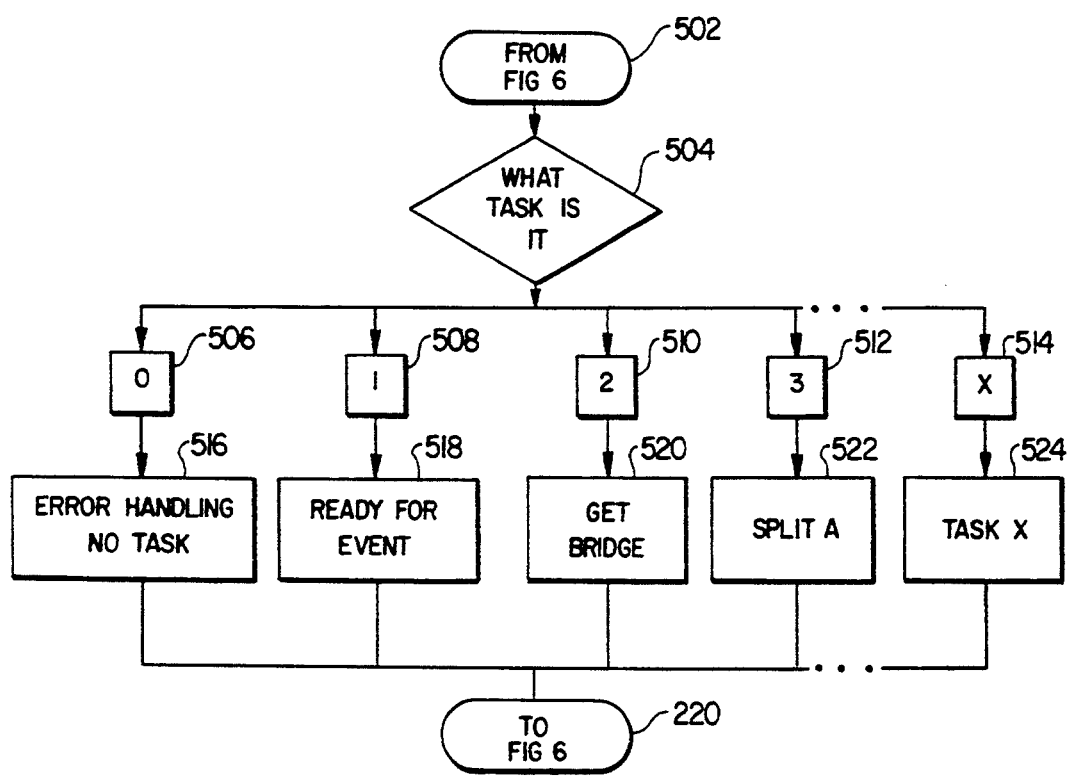
FIG. 9 illustrates in flow chart form the retrieval of a particular task for execution.

The kernel of the present system then proceeds to execution of the selected task at 216. Thereafter the flow proceeds to 218 which directs the flow to FIG. 9. From step 502, the kernel moves to 504 at which point the kernel determines what task to perform. As previously noted, on FIG. 8, the task number was identified as illustrated on the task table shown in FIG. 4. That task number is associated with a block of program code which would perform a particular set of steps. For example, tables I, II, III and IV show the program code in the PLEX language for performing specific tasks.

Table I shows the source code for making a third caller identified as the "C" caller disjoint, i.e., putting the caller on hold. Table II shows the code for disconnecting a second caller identified as the "B" caller. Table III shows the code for sending a busy tone to a second caller identified as the "B" caller. Table IV shows the code for totally disconnecting the call.

TABLE I

| | |
|---|---|
| 3485. | SPLIT C MAKE C DISJOINT |
| 3486. | ! |
| 3487. | SPLITC) |
| 3488. | |
| 3489. | IF CSTATUS = ZCONN PROCEED |

TABLE I-continued

```
3490.    ELSE GOTO SPLITC90;
3491.
3492.    SEND SPLIT REFERENCE FSHREF WITH
3493.       FSHPTR,
3494.       TWCPTR,
3495.       COWNREF,
3496.       CLEGID,
3497.       BRIDGESIEZED, ! BRIDGE VALIDITY (GUARD BIT) !
3498.       BRIDGEID; ! BRIDGE IDENTITY !
3499.
3500.    TRL = ZSPLITC10; DO PUSH; EXIT; SPLITC10)
3501.
3502.    CSTATUS = ZDISJ;
3503.    DO COUNTCONN;
3504.
3505.    SPLITC90)
3506.
3507.    GOTO SUBRET; ! END OF SPLIT C SPLIT !
```

® Telefonaktiebolaget L M Ericsson 1991

TABLE II

```
3530.    FREE B DISCONNECT B
3531.    !
3532.    FREEB)
3533.
3534.    IF BSTATUS = ZDISJ PROCEED
3535.    ELSE GOTO FREEB90;
3536.
3537.    SEND FREE REFERENCE FSHREF WITH
3538.       FSHPTR,
3539.       TWCOTR,
3540.       COWNREF,
3541.       BLEGID;
3542.
3543.    TRL = ZFREEB10; DO PUSH; EXIT; FREEB10)
3544.
3545.    BSTATUS = ZDISC;
3546.
3547.    FREEB90)
3548.
3549.    GOTO SUBRET; ! END OF FREEB !
```

® Telefonaktiebolaget L M Ericsson 1991

TABLE III

```
2965.    SEND BUSY TONE TO "B".
2966.    !
2967.    TOBSNDBUSY) ! TO "B" SEND BUSY TONE - TASK !
2968.
2969.    IF TONETOB = FALSE PROCEED
2970.    ELSE GOTO TOBSNDBUSY90;
2971.
2972.    SEND SENDINF REFERENCE FSHREF WITH
2973.    ! 1 ! FSHPTR,             ! SEND BUSY TONE TO B !
2974.    ! 1 ! TWCPTR,
2975.    ! 3 ! COWNREF,
2976.    ! 4 ! BLEGID,
2977.    ! 5 ! ZDYNTABLE4,         ! DYN TABLE - MSG INFO !
2978.    ! 6 ! 1,                  ! MESSAGE NO. !
2979.    ! 7 ! 7,                  ! ELEMENT = SEND BUSY TONE !
2980.    ! 8 ! BRIDGESIEZED,
2981.    ! 9 ! BRIDGEID;
2982.
2983.    TRL = ZTOBSNDBUSY10; DO PUSH; EXIT; TOBSNDBUSY10)
2984.
2985.    CASE TSIGNALRESULT IS
2986.    WHEN ZSUCCESS DO; ! CONTINUE !
2987.       TONETOB = TRUE;
2988.    WHEN ZFAILURE DO
2989.       FINISHRESULT = ZFAILUREDEFAULT;
2990.       GOTO RETURNAB;
2991.    OTHERWISE DO
2992.       GOTO HANGEXIT;
2993.    ESAC;
2994.
2995.    TOBSNDBUSY90)
2996.
2997.    GOTO SUBRET; ! END OF TOBSNDBUSY !
```

® Telefonaktiebolaget L M Ericsson 1991

TABLE IV

```
4563.    ————————————————————————=
4564.    PROCEDURE TOTALDISC TOTALDISCONNECT TOTAL DISCONNECT
4565.    ————————————————————————=
4566.
4567.    THIS PROCEDURE WILL COMPLETELY DISCONNECT THE CALL. IT WILL SPLIT ANY
4568.    CONNECTED LEGS, FREE THEM, DECREMENT THE TRAFFIC LEVEL COUNTER,
4569.    AND FINISH.
4570.    !
```

TABLE IV-continued

```
4571. TOTALDISC)
4572.
4573. TRL = ZTOTALDISC10; DO PUSH; GOTO SPLITC; TOTALDISC10)
4574.
4575. TRL = ZTOTALDISC20; DO PUSH; GOTO SPLITB; TOTALIDSC20)
4576.
4577. TRL = ZTOTALDISC30; DO PUSH; GOTO FREEA; TOTALDISC30)
4578.
4579. TRL = ZTOTALDISC40; DO PUSH; GOTO FREEB; TOTALDISC40)
4580.
4581. TRL - ZTOTALDISC50; DO PUSH; GOTO FREEC; TOTALDISC50)
4582.
4583. GOTO FINISHEND;
4584.
4585. ! ABSOLUTE END OF PROCEDURE TOTALDISC TOTALDISCONNECT !
```

® Telefonaktiebolaget L M Ericsson 1991

Figure 10:
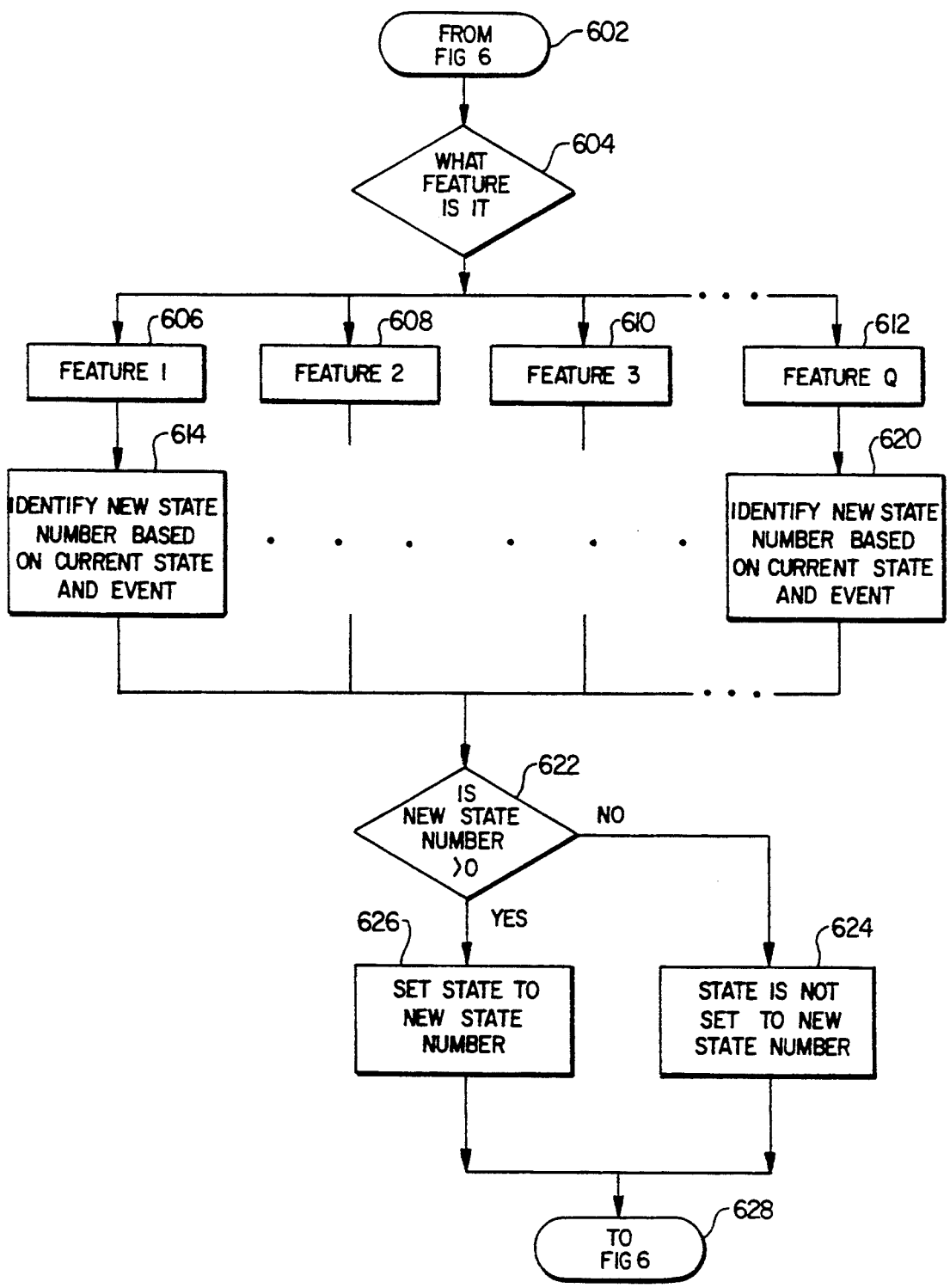
FIG. 10 illustrates in flow chart form the identification of a new state after implementation of a series of tasks.

Returning to FIG. 9, identification of one of the many tasks is determined at 504. The decision flow then proceeds to the selected one of the particular task numbers 506-514 which in turn identify the specific tasks 516-524. Once there is an identification of one of the specific tasks 516-524, the kernel retrieves the actual program code such as that shown in tables I, II, III and IV and performs those steps. At 220, the kernel returns to FIG. 6 and enters decision step 222 thereof to determine whether the variable $T_x$ is equal to the number of tasks. If it is not, the "no" path is taken back to step 208 and the variable $T_x$ is set to the next number and retrieval of the next task is performed at step 210 and so forth. If the variable $T_x$ does equal "N" then all of the tasks have been performed and the kernel proceeds to step 224 which involves setting a new state. From step 224 the kernel proceeds to step 226 which directs the kernel to FIG. 10 at step 602. From step 602 it proceeds to step 604 to determine which feature was invoked. Identification of the feature invoked is necessary because a next-state table similar to what is depicted in FIG. 5 is associated with a particular feature. Therefore, the decision block 604 determines which of the features 1-N (606-612) have been invoked. Once a feature is identified, the kernel proceeds to one of steps 614-620 depending on which feature has been selected to identify a new state based on the current state and event. A new state number is determined by reference to a next-state table similar to that depicted in FIG. 5. Based on the previous state and the precipitating event, a new state is selected. Once that state number has been determined the kernel enters step 622 to make sure that the new state number is greater than 0. If the new state number is not greater than 0 there is some error in the feature program, and the kernel takes the no path and does not reset the state from what it previously was which occurs at step 624. If the new state number is greater than 0, indicating that an appropriate state has been selected, the yes path is taken from 622 to step 626 and a new state is set at that number. Either way, the kernel returns from FIG. 10 at step 628 to FIG. 6 at step 228. From FIG. 228 the program proceeds to step 230, exits and awaits a further precipitating event.

The kernel can be described in pseudo-code form as depicted in Table V below.

TABLE V

```
BEGIN
  row <= indexes-to-task-lists (event, state);
  numberoftasks <= list-of-tasks (row, 0);
  FOR i <= 1 THROUGH numberoftasks DO BEGIN
    task <= list-of-tasks (row, i);
    CALL execute-a-task (task);
```

TABLE V-continued

```
  END;
  state <= next-state (event, state);
END.
% Procedure "execute-a-task" is defined as follows:
BEGIN
PROCEDURE execute-a-task (task);
INPUT PARAMETER task IS TYPED INTEGER;
CASE task IS BEGIN
  WHEN 1 DO
    CALL task01;
  WHEN 2 DO
    CALL task02;
  WHEN 3 DO
    CALL task03;
  .
  .
  WHEN n DO
    CALL taskn;
END CASE;
END OF PROCEDURE taskcase;
```

® Telefonaktiebolaget L M Ericsson 1991

It is thus believed that the operation and construction of the present invention will be apparent from the foregoing description. While the method, apparatus and system shown and described has been characterized as being preferred it will be obvious that various changes and modifications may be made therein without departing from the spirit and the scope of the invention as defined in the following claims.

What is claimed is:

1. A method of implementing a telecommunications feature within a telecommunications switch having memory means and a plurality of system states, said feature being controlled by a feature program which is executed within said memory means, said feature program comprising executable task code, said method comprising the steps of:

defining in a first table for said telecommunications feature the various states through which a call can transit and the events which precipitate those state transitions, said first table specifying for a given state and event an index to a list of tasks to be performed in order to complete that transition;

defining in a second table an array of lists of tasks, each list specifying a sequence of tasks to be performed in association with that list;

defining in a third table for a given state and event an index to the next state to which the call should transition;

executing said feature program to access and analyze said first table, via state and event indexes, to determine which list of tasks within said second table is to be accessed;

accessing the determined list of tasks and executing each of the tasks on the list in sequence;

executing said feature program in response to completion of each of the tasks on said list to access and analyze the third table to access the next state and await the next precipitating event; and modifying the contents of one or more of said tables while said tables are contained within said memory means in order to change the behavior of said telecommunications feature without re-compiling said feature program.

2. A method for implementing a telecommunications feature within a telecommunications switching system having a plurality of states as set forth in claim 1, wherein each of said first, second and third tables are stored in a memory of said telecommunications switching system.

3. A method for implementing a telecommunications feature within a telecommunications switch having a plurality of states as set forth in claim 1, wherein a particular set of first, second and third tables are stored in a memory of said telecommunications switch for providing a particular feature for a particular subscriber.

4. A system for implementing a telecommunications feature within a telecommunications switch having memory means and a plurality of system states, said feature being controlled by a feature program which is executed within said switch, said feature program having executable task code, said system comprising:

means for defining in a first table for a telecommunications feature the various states through which a call can transit and the events which precipitate those state transitions, said first table specifying for a given state and event an index to a list of tasks to be performed in order to complete that transition;

means for defining in a second table an array of lists of tasks, each list specifying a sequence of tasks to be performed in association with that list;

means for defining in a third table for a given state and event an index to the next state to which the call should transition;

means for executing said feature program to access and analyze said first table, via state and event indexes, to determine which list of tasks within said second table is to be accessed;

means for accessing the determined list of tasks and executing each of the tasks on the list in sequence;

means for executing said feature program in response to completion of each of the tasks on said list to access and analyze the third table to access the next state and await the next precipitating event; and means for modifying the contents of one or more of said tables while said tables are contained within said memory means in order to change the behavior of said telecommunications feature without re-compiling said feature program.

5. A system for implementing a telecommunications feature within a telecommunications switch having a plurality of states as set forth in claim 4, wherein each of said first, second and third tables are stored in a memory of said telecommunications switch.

6. A system for implementing a telecommunications feature within a telecommunications switch having a plurality of states as set forth in claim 4, wherein a particular set of first, second and third tables are stored in a memory of said telecommunications switch for providing a particular feature for a particular subscriber.

7. A method of providing a plurality of telecommunication features in a voice and data telecommunications switch for a plurality of subscribers, said features being controlled by a feature program comprising executable task code which is executed within said switch, said method comprising the steps of:

receiving a precipitating event signal in said telecommunications switch from one of said plurality of subscribers;

identifying, in response to receiving said precipitating event signal, an associated feature;

identifying, from a plurality of predefined tasks, those tasks which implement said identified feature;

retrieving said identified tasks from a previously formatted array;

processing said retrieved tasks to implement said identified feature; and reformatting said previously formatted array to provide a different one of said plurality of features in response to a precipitating event, without said feature program being re-compiled.

8. The method of claim 7 wherein said step of processing said retrieved tasks to implement said identified feature includes the steps of:

retrieving a predefined executable program code associated with each particular task; and executing said predefined executable program code to perform said task.

9. A system for providing a plurality of telecommunication features in a voice and data telecommunications switch for a plurality of subscribers with control of said plurality of telecommunication features being preformed by a feature program executing within said telecommunications switch, said feature program having executable task code which implements said plurality of telecommunication features, said system comprising:

means for receiving a precipitating event signal in said telecommunications switch from one of said plurality of subscribers;

means for identifying, in response to receiving said precipitating event signal, an associated feature;

means for identifying, from a plurality of predefined tasks, those tasks which implement said identified feature;

means for retrieving said identified tasks from a previously formatted array;

means for processing said retrieved tasks to implement said identified feature; and means for reformatting said previously formatted array to provide a different one of said plurality of features in response to a precipitating event, without said feature program being re-compiled.

10. The system of claim 9 wherein said means for processing said retrieved tasks to implement said identified feature further comprises:

means for retrieving a predefined executable program code associated with each particular task; and means for executing said predefined executable program code to perform said task.

11. In a voice and data telecommunication switch a method of transitioning between states in response to a plurality of signals, wherein a feature program implements a first set of tasks for transitioning from one state to another, said first set of tasks being a subset of a second set of tasks comprising all tasks performable by said
feature program, said method comprising the steps of:
defining each of said second set of tasks as a block of predefined executable program code;
associating each of said blocks of predefined executable program code with a corresponding pointer;
inserting each of said corresponding pointers into at least one single entry two-dimensional array of pointers;
identifying said first set of tasks required for transitioning from one state to another;
associating each task in said first set of tasks with one of said corresponding pointers;
processing each block of predefined executable program code associated with said pointers associated with said first set of tasks to arrive at a new state; and
modifying said two-dimensional array of pointers to identify tasks from said second set of tasks required for transitioning from any of said states to another without said blocks of predefined executable program codes being re-compiled.

12. In a voice and data telecommunication switch a system for transitioning between states in response to a plurality of signals, wherein a feature program implements a first set of tasks for transitioning from one state to another, said first set of tasks being a subset of a second set of tasks comprising all tasks performable by said feature program, said system comprising:
means for defining each of said second set of tasks as a block of predefined executable program code;
means for associating each of said blocks of predefined executable program code with a corresponding pointer;
means for inserting each of said corresponding pointers into at least one single entry two-dimensional array of pointers;
means for identifying said first set of tasks required for transitioning from one state to another;
means for associating each task in said first set of tasks with one of said corresponding pointers;
means for processing each block of predefined executable program code associated with said pointers associated with said first set of tasks to arrive at a new state; and
means for modifying said two-dimensional array of pointers to identify tasks from said second set of tasks required for transitioning from any of said states to another without said blocks of predefined executable program codes being re-compiled.

13. A method of providing a plurality of telecommunication features within a telecommunications switch for a plurality of subscribers, said switch having memory means and each one of said subscribers having a current state and being associated with at least one of said features, each one of said features being associated with a group of arrays, said features being controlled by a feature program which is executed within said memory means, said feature program comprising executable task code, said method comprising the steps of:
formatting each group of arrays in said storing means into a corresponding state table;
receiving a precipitating event signal in said switch from one of said subscribers;
executing said feature program in response to said received event signal;
identifying one of said features which is associated with said subscriber;
identifying said group of arrays associated with said identified feature;
retrieving a task list element from a first array in said identified group of arrays by indexing said first array with said event signal and said current state, said retrieved task list element identifying a plurality of task elements within a second array in said group of arrays;
retrieving said task elements from said second array by indexing said second array with said retrieved task list element, each one of said task elements identifying a portion of said executable task code;
executing said portions of said executable task code identified by said retrieved task elements;
retrieving a next-state element from a third array in said group of arrays by indexing said third array with said event signal and said current state, said retrieved next-state element indicating a next state; and
transitioning said subscriber from said current state to said indicated next state.

14. The method of claim 13 further comprising the step of:
modifying the contents of said first, second, or third arrays while said arrays are contained in said storing means so that the behavior of said identified feature is changed without re-compiling said feature program.

* * * * *